July 4, 1967 M. V. D'AGOSTINO 3,329,835
LOGIC ARRANGEMENT
Filed Nov. 20, 1964
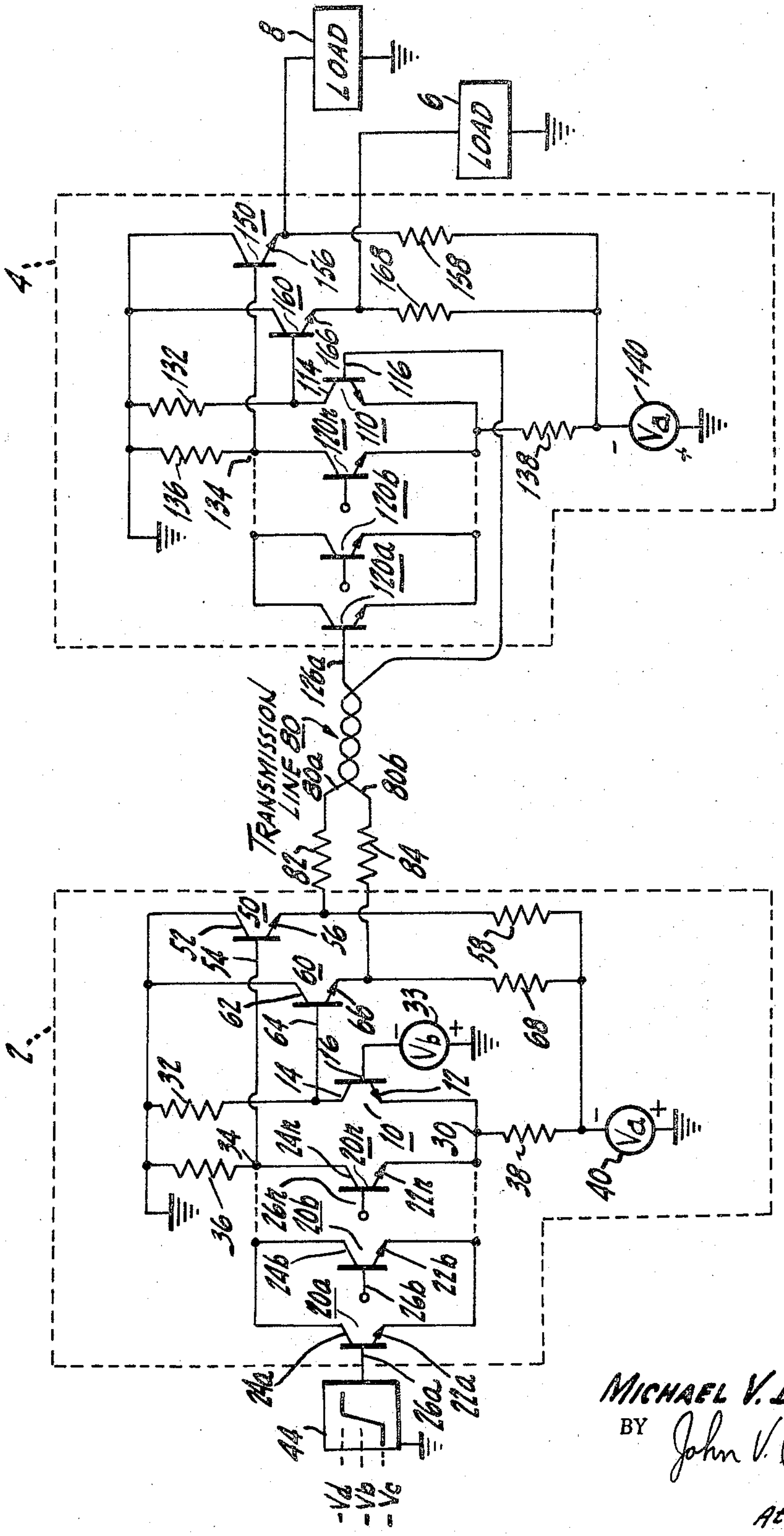
INVENTOR.
MICHAEL V. D'AGOSTINO
BY John V. Regan
Attorney United States Patent Office 3,329,835

Patented July 4, 1967

3,329,835
LOGIC ARRANGEMENT

Michael V. D'Agostino, Flemington, N.J., assignor to Radio Corporation of America, a corporation of Delaware Filed Nov. 20, 1964, Ser. No. 412,798
8 Claims. (Cl. 307—88.5)

This invention relates to logic arrangements and, in particular, to an improved arrangement for interconnecting remotely located logic circuits, and to a logic circuit arrangement using the improved interconnecting technique.

In high speed digital computers where signal rise and fall times are of very short duration and signal repetition rates are high, a long length of wire (in terms of electrical length) interconnecting two logic circuits must be treated as a transmission line. Unless such a line is properly shielded, large amplitude noise spikes may be induced in the line due to cross talk with a neighboring line when a fast rise time signal is transmitted on the neighboring line. These noise spikes may be of sufficient amplitude to cause erroneous operation of the circuit driven by the line.

Moreover, if a long line is not properly terminated, the transmitted information signal may be reflected, thereby superimposing noise on the information signal. This superimposed noise also may cause erroneous operation and even double switching of the driven stage, with resulting erroneous output information therefrom. The usual type of termination is a resistor connected in shunt at the output end of the line and having a value to terminate the line in its characteristic impedance, which usually is quite low. A termination of this type is wasteful in terms of power and may even require a separate power supply.

Accordingly, it is an object of this invention to provide an improved arrangement for interconnecting logic circuits that are not located close to one another.

It is another object of this invention to provide an interconnecting arrangement in which noise induced on interconnecting lines from an external source does not cause erroneous operation of the driven circuit.

It is still another object of this invention to provide a transmission line arrangement which need not be terminated by a shunt resistor at the output end of the line.

It is a more specific object of this invention to provide an improved arrangement for interconnecting emitter coupled current steering logic gates.

The interconnecting arrangement of this invention makes use of a two-conductor transmission line. A signal output of the driver stage is applied at the input end of one of the conductors, and the complement of this signal output is applied at the input end of the other conductor, whereby the transmission line is driven push-pull. The driver circuit preferably is an emitter coupled, current steering logic circuit which has complementary outputs. The output ends of the two conductors are connected respectively to two push-pull inputs of a driven circuit, which also preferably is an emitter coupled, current steering logic circuit. Reflections of a harmful nature are eliminated by connecting a separate resistor in series with each conductor at the input end thereof, the value of each resistor plus the output impedance of the respective input network being equal to one-half the characteristic impedance of the transmission line.

In the sole figure of the drawing, the circuit located within dashed box 2 is the driver circuit, and the circuit located within dashed box 4 is the driven, or receiver circuit. Each of these circuits is illustrated as a so-called "emitter coupled, current steering logic circuit." In some applications, the circuitry within dashed box 4 may be considered to be a part of the interconnection network, and either of the loads 6 or 8 may be considered the driven circuit. This will become clearer as the discussion proceeds.

The driver circuit includes a first transistor 10 of one conductivity type, illustrated as NPN type, connected in a first circuit branch, and a plurality of transistors 20*a* . . . 20*n* of the same one conductivity type connected in paralel in a second circuit branch. First transistor 10 has its emitter 12 connected to a junction point 30 and has its collector 14 connected through a supply resistor 32 to a point of fixed potential, illustrated as circuit ground. The base 16 of first transistor 10 is connected to the negative terminal of a source 33 of bias of $V_b$ volts. Source 33, which may be a battery for example, has its positive terminal grounded.

Each of the transistors 20*a* . . . 20*n* has its emitter 22*a* . . . 22*n*, respectively, connected to the common junction 30. The collector 24*a* . . . 24*n* are connected together and by way of a collector supply resistor 36 to circuit ground. A common emitter resistor 38 is connected between junction point 30 and the negative terminal of a source 40 of $V_a$ volts bias potential, where $|V_a|>|V_b|$. Source 40 may be, for example, a battery (not shown) having its positive terminal grounded.

A further transistor 50 of the same one conductivity type has its collector 52 connected directly to circuit ground and has its base 54 directly connected to a junction 34 common to the collectors 24*a* . . . 24*n*. The emitter 56 of transistor 50 is connected by way of an emitter resistor 58 to the negative terminal of bias source 40. Still another transistor 60 of the one conductivity type is similarly connected at the output of first transistor 10. Specifically, the collector 62 of transistor 60 is connected directly to ground and the base 64 is connected directly to the collector 14 of first transistor 10. The emitter 66 is connected by way of a resistor 68 to the negative terminal of source 40.

The separate input signals applied at the bases 26*a* . . . 26*n* of the transistors 20*a* . . . 20*n*, respectively, in the driver circuit have either a value of $-V_c$ volts or $-V_d$ volts. Preferably, the voltage $-V_b$ supplied to the base 16 of first transistor 10 has a value midway between the signal levels $-V_c$ and $-V_d$. Base 26*a* of transistor 20*a* receives its input signals from a source represented by a box 44. This source may be, for example, the output of one of the emitter follower transistors 50 or 60 in another logic circuit (not shown) similar to the driver 2. The bases 26*b* . . . 26*n* may also receive their input signals from the outputs of other logic circuits (not shown).

The circuit located within dashed box 4 is structurally identical to the driver circuit just described with one exception, namely that the base 116 of the first transistor 110 in the driven circuit is not connected to a source of fixed bias potential. Because of the similarity of the driver and driven circuits, the structure of the driven circuit will not be described. The various components therein have reference numerals in the 100 series in which the ten's and unit's digits are the same as the reference numerals of the corresponding components in the driver circuit 2. One or more load circuits, represented by box 8, are connected at the emitter 156 of transistor 150, and one or more load circuits, represented by box 6, are connected at the emitter 166 of transistor 160. Each of these loads is assumed to be an emitter coupled current steering logic circuit of the type illustrated schematically within dashed box 2.

As mentioned previously, when the driven circuit and driver circuit are not located close to one another, the lines interconnecting these two circuits must be considered as transmission lines. Ordinarily, the output from only one of the emitter follower transistors 50, 60 in the driver circuit is applied as an input to a transistor in any one driven circuit. In the present embodiment, however, a two-conductor transmission line 80 is employed, which transmission line may be, for example, a two-wire twisted pair, a co-axial cable, or other suitable two-wire transmission line. The input end of one line 80*a* is connected by way of a resistor 82 to the emitter 56 of transistor 50. The input end of the other line 80*b* is connected by way of a resistor 84 to the emitter 66 of the other emitter follower transistor 60. The output end of the latter line 80*b* is connected directly to the base 126*a* of transistor 120*a* in the receiving circuit, and the output end of the one line 80*a* is connected directly to the base 116 of the transistor 110 in the receiving circuit.

Resistors 82 and 84 in series with the interconnecting lines 80*a* and 80*b*, respectively, are chosen in value to terminate the input end of the transmission line 80 in its characteristic impedance. The "internal" impedance of the drive source as seen at the emitter 56 of transistor 50 is the value of emitter resistor 58 in parallel with the impedance seen looking into the emitter 56. The latter impedance has a value approximately equal to the value of the resistor 36 in the base 54 circuit divided by the beta of transistor 50. Resistor 82 is chosen so that its value plus the value of the "source" impedance aforementioned is equal to one-half the characteristic impedance $Z_0$ of the transmission line 80. In like manner, resistor 84 is chosen so that its value of the "source" impedance seen at the emitter 66 of transistor 60 is one-half the characteristic impedance of the transmission line 80. Therefore, the total impedance appearing across the input of transmission line 80 is equal to the characteristic impedance of the line.

Consider now the operation of the overall arrangement and assume by way of example that the input signal levels $-V_c$ and $-V_d$ have values of −1.6 volts and −0.8 volt, respectively. The fixed bias $-V_b$ applied at the base 16 of first transistor 10 then preferably has a value of −1.2 volts, midway between the two signal levels.

In one operating condition of the circuit, the signals applied at all of the base electrodes 26*a* . . . 26*n* have values of $-V_c$ volts. This value is less than the fixed bias $-V_b$, whereby first transistor 10 conducts. The common emitter voltage at junction 30 then has a value of approximately −2 volts by virtue of the drop across the emitter 12-base 16 junction. This voltage is of such a value as to bias all of the transistors 20*a* . . . 20*n* in a nonconducting condition, whereby essentially no current flows through collector resistor 36 to the transistors 20*a* . . . 20*n*. The voltage at collector junction 34 is then approximately ground potential. The current flow through emitter resistor 38 is determined by the bias $-V_b$, the value of common emitter resistor 38 and the value of the $-V_a$ source 40. Except for a small base 16 current, this current flows through the collector resistor 32. The value of this resistor 32 is chosen so that with the aforementioned current flow through the resistor the voltage at collector 14 has a value of −0.8 volt.

With −0.8 volt at the collector 14, emitter follower transistor 60 conducts and the voltage at its emitter 66 is approximately −1.6 volts, which will be recognized as equal to one of the input signal levels. The base 54 of the other emitter follower transistor 60 is at ground potential at this time. Transistor 50 conducts and the voltage at its emitter 56 is approximately −0.8 volt, equal to the other input signal level.

The voltages at emitters 56 and 66 are coupled by way of the transmission line 80 to the base electrodes 116 and 126*a*, respectively, of the transistors 110 and 120*a* in the driven circuit 4. Neglecting D.C. losses in the coupling network, it will be seen that the voltage at base 116 has a value of −0.8 volt and the voltage at base 126*a* has a value of −1.6 volts. Accordingly, transistor 110 conducts and transistor 120*a* is biased in the off condition (assuming no input connections to the transistors 120*b* . . . 120*n*). The voltage at collector junction 134 is at ground potential, emitter follower transistor 150 conducts, and the voltage at the emitter 156 thereof is −0.8 volt, which is the same as the voltage at the emitter 56 of transistor 50 in the driver circuit. Collector resistor 32 is selected to have a value such that the voltage at collector 114 is −0.8 volt when transistor 110 conducts. Emitter follower transistor 160 is biased in conduction and the voltage at its emitter 166 is the same as the voltage at the emitter 66 of transistor 60 in the driver circuit. Accordingly, the loads 6 and 8 receive the same inputs, respectively, from the driven circuit 4 as would be received if the loads 6 and 8 were connected directly to corresponding points at the output of the driver circuit 2.

In the other quiescent operating state of the circuit, the inputs to one or more of the transistors 20*a* . . . 20*n* has the value −0.8 volt. Let it be assumed that this input level is applied at the base 26*a* of transistor 20*a*. Transistor 20*a* then conducts, and the voltage at common emitter junction 30 is approximately −1.6 volts, a value sufficient to bias first transistor 10 in the off condition. All of the current flowing through common emitter resistor 38 flows in the emitter 22*a* of transistor 20*a*. The value of collector resistor 36 is chosen so that the voltage at collector junction 34 is −0.8 volt when one or more of the transistors 20*a* . . . 20*n* conducts. Emitter follower transistor 50 then has an emitter 56 voltage of −1.6 volts. Concurrently, the voltage at collector 14 of first transistor 10 is at ground potential, and the voltage at the emitter 66 of transistor 60 is approximately −0.8 volt. Thus, the output signals at emitters 56 and 66 are reversed from the previous steady state operating condition. By similar reasoning it may be seen that the voltages at the emitters 156 and 166 of transistors 150 and 160, respectively, are −1.6 and −0.8 volts, respectively. So far as the loads 6 and 8 are concerned their steady state inputs are unaffected by the presence of the driven circuit 4 and the transmission line 80.

During the transition from the one steady operating state to the other, the output at one of the emitters 56 and 66 rises from −1.6 volts to −0.8 volts while the output at the other emitter falls from −0.8 to −1.6 volts. The changing wavefront travels down the transmission line 80 to the base electrodes 116 and 126*a*. The transistors 120*a* and 110 present a very high impedance at the output end of the transmission line 80 because of the emitter resistor 138 acting in conjunction with the current gain of the input transistors 110, 126*a* (or $\beta R_e$, where $\beta$ is the beta of the transistor and $R_e$ is the emitter resistance of the same transistor). This high terminating impedance causes a signal to be reflected from the output end of the transmission line to the input end thereof. However, the transmission line 80 is terminated in its characteristic impedance at the input end by the resistors 82 and 84 and the driving source impedances. For this reason, the wave reflected from the output end of the line 80 is completely absorbed in the characteristic impedance termination at the input end, and there are no further reflections in the line.

Since the output end of the line 80 is terminated in a veryhigh impedance, very little steady state current flows in the transmission line 80 and very little power is dissipated in the terminating resistors 82 and 84. This represents a considerable reduction in power dissipation as compared to the power dissipation in a resistor connected between the output end of the line and circuit ground, and having a value equipped to the characteristic impedance of the line.

One of the most serious problems encountered in high speed logic circuits having long interconnecting lines is the effect of signal voltages induced in the line by way of cross talk from neighboring lines and other noise sources. In prior art circuits employing a single line interconnection, the magnitude of the signal induced in the line by cross talk may be of sufficient amplitude to overcome the threshold of the circuit connected at the output end of the line, thereby causing false triggering of the driven circuit and an erroneous output signal therefrom.

The manner in which the interconnecting network of this invention effectively eliminates the effect of noise signals will now be described. The two lines 80*a* and 80*b* of the transmission line 80 are in close proximity to one another. For example, they may be a twisted pair. Any noise from an external source has a substantialy equal effect on each of the lines 80*a* and 80*b*. For example, external noise which indues a positive signal in one line 80*a* also induces a positive signal of the same, or approximately the same, amplitude in the other line 80*b*. Therefore, the voltage changes at the two base electrodes 116 and 126*a* due to noise vary in phase and with the same amplitude, and the driven circuit 4 produces common mode rejection in the following manner.

Consider the steady state operating condition in which the voltage at base electrode 126*a* is −1.6 volts and the voltage at the base electrode 116 is −0.8 volt. The resulting voltages at common collector junction 134 and the collector 114 are zero volts and −0.8 volt, respectively. When a noise signal is induced in the transmission line 80 each of the voltages at base electrode 126*a* and 116 varies the same amount and in the same direction, as mentioned previously. Accordingly, any such noise signal is ineffective to turn on the transistor 120*a*, and the voltage at common collector junction 134 remains at ground potential. The load 8, therefore, continues to receive an input voltage of −0.8 volt from the emitter follower transistor 150.

The voltage induced in the transmission line 80, however, changes the voltage at the base electrode 116 and causes transistor 110 to conduct more or less current, depending upon the polarity direction of the noise signal. If the combination of the one emitter resistor 138 and bias source 140 operates as a source of substantially constant current, very little change will occur in the collector 114 curent, and very little change then will occur in the collector 114 voltage. Even if the resistor 138 and source 140 do not approximate a constant current source, the only result of a noise signal applied at the base 116 will be to change the current flowing through the collector resistor 132. This, of course, will result in a change of voltage at the collector 114 and at the emitter 116 of transistor 160. If the change is not too great, however, there will be no adverse effects for the following reason. Load 6 is one or more emitter coupled current, steering logic circuits similar to the driven circuit 2. For the operating conditions given, the input to load 6 in the steady state is −1.6 volts, which means that the input transistor receiving this signal is based in an off condition and remanis off until the input voltage exceeds $V_b$ volts. Accordingly, the voltage at the emitter 166 can change from −1.6 volts close to −1.2 volts without causing switching in the load 6.

What has been said about the "noise immunity" of the circuit applies with equal force for the other steady state operating condition. For example, when the voltages at base electrodes 126*a* and 116 are −0.8 volt and −1.6 volts, respectively, transistor 120*a* conducts and transistor 110 remains off. Any noise induced on the transmission line 80 will have the same effect at each of the base electrodes 116 and 126*a*. Thus, transistor 116 will remain nonconducting in the presence of noise signals and the output at the emitter 166 of transistor 160 will remain at −0.8 volt. The noise signal at base 126*a* may vary the current through transistor 120*a* and thereby vary the output voltage at emitter 156 over a range of values above and below −1.6 volts. However, the −1.6 volts applied to the circuit in load 8 causes the receiving transistor therein to be cut off, and this transistor remains cut off unless the noise signal shifts the voltage at emitter 156 to a value more positive than −1.2 volts.

By way of summary, the resistors 82 and 84 in series with the separate conductors of the transmission line 80 provide proper termination for the line and eliminate harmful reflections therein. The push-pull driven circuit 4 provides common mode rejection to eliminate the effects of induced noise signals of practical value and thereby avoid any false triggering of driven loads and resulting erroneous outputs therefrom. Although all of the transistors have been illustrated in the drawing as being of NPN type, it will be apparent to one skilled in the art that PNP transistors could be used alternatively, provided that the usual changes are made in the polarities of the bias potentials and, where necessary, in the signal levels.

What is claimed is:

1. The combination comprising:
first and second signal terminals;
signal means coupled to said first and second signal terminals and providing signals of opposite phase thereat;
push-pull receiver circuit means having first and second input terminals;
first and second conductors defining a transmission line having an input end, an output end, and a characteristic impedance;
means coupling the output ends of the first and second conductors to different ones of said first and second input terminals; and
first and second impedance means respectively connecting the input ends of the first and second conductors to different ones of said first and second signal terminals, said first and second impedance means having values to terminate the input end of said transmission line in its characteristic impedance.

2. The combination comprising:
first and second signal terminals;
signal means coupled to said first and second signal terminals and producing signals of opposite phase thereat;
first and second amplifying devices each having an output electrode, a control electrode and a common electrode;
a resistor having one terminal connected to each said common electrode;
means for applying operating potential between the other terminal of said resistor and each said output electrode;
first and second conductors defining a transmission line having an input end, an output end, and a characteristic impedance;
means connecting the output ends of the first and second conductors to the control electrodes of the first and second amplifying devices, respectively;
a second resistor connected between the input end of one of the conductors and the first signal terminal; and
a third resistor connected between the input end of the other conductor and the second signal terminal, said second and third resistors having values to terminate the input end of said transmission line in its characteristic impedance.

3. The combination comprising:
first and second signal terminals and a point of reference potential;
signal means coupled to said input terminals and providing a signal of one phase between one of said signal terminals and said point of reference potential, and providing a signal of the opposite phase between the other signal terminal and said point of reference potential;
the impedance between the first signal terminal and said point of reference potential having a value $X_1$ and the impedance between the second signal terminal and said point of reference potential having a value $X_2$;
push-pull receiver circuit means having first and second input terminals;

first and second conductors defining a transmission line having an input end, an output end, and a characteristic impedance $Z_0$;

means coupling the output end of each of said conductors to a different one of said first and second input terminals;

a first resistor connected between the first signal terminal and the input end of the first conductor, and having a value $R_1$; and a second resistor connected between the second signal terminal and the input end of the second conductor, and having a value $R_2$, where the sum of $R_1$, $R_2$, $X_1$ and $X_2$ is equal to $Z_0$.

4. The combination comprising:

first and second signal terminals and a point of reference potential;

signal means coupled to said input terminals and providing a signal of one phase between one of said signal terminals and said point of reference potential, and providing a signal of opposite phase between the other signal terminal and said point of reference potential;

the impedance between the first signal terminal and said point of reference potential having a value $X_1$ and the impedance between the second signal terminal and said point of reference potential having a value $X_2$;

receiver circuit means including first and second amplifying devices each having a control electrode, an output electrode and a common electrode;

resistance means having one terminal connected to each said common electrode;

second and third impedance means each having one terminal connected to a different said output electrode;

means for applying operating potential between the other end of the first impedance means and the other end of each of the second and third impedance means;

first and second conductors defining a transmission line having an input end, an output end, and a characteristic impedance $Z_0$;

means coupling the output end of each of said conductors to a different said control electrode;

a first resistor connected between the first signal terminal and the input end of the first conductor, and having a value $R_1$; and a second resistor connected between the second signal terminal and the input end of the second conductor, and having a value $R_2$, where the sum of $R_1$, $R_2$, $X_1$ and $X_2$ is equal to $Z_0$.

5. The combination comprising:

first and second transistors of like conductivity type each connected in an emitter follower configuration and each transistor having a base electrode;

circuit means applying signals of one phase and an opposite phase between the different base electrodes, respectively, and a point of reference potential;

a two-wire transmission line having an input end, an output end and a characteristic impedance;

a first resistor connected between the emitter of the first transistor and the input end of the first wire in the transmission line;

a second resistor connected between the emitter of the second transistor and the input end of the second wire in the transmission line, said first and second resistors having values which, together with the output impedances of the emitter followers, terminate the input end of said transmission line in its characteristic impedance;

push-pull reciver means having first and second input terminals; and means connecting the output end of each of the two wires to a different one of said input terminals of said receiver means.

6. The combination comprising:

first and second transistors of like conductivity type each connected in an emitter follower configuration and each transistor having a base electrode;

circuit means applying signals of one phase and an opposite phase between the said base electrodes of the first and second transistors, respectively, and a point of reference potential;

a two-wire transmission line having an input end, an output end and a characteristic impedance;

a first resistor connected between the emitter of the first transistor and the input end of the first wire in the transmission line;

a second resistor connected between the emitter of the second transistor and the input end of the second wire in the transmission line, said first and second resistors having values which, together with the output impedances of the emitter followers, terminate the input end of said transmission line in its characteristic impedance;

third and fourth transistors of the same conductivity type each having an emitter electrode, a base electrode and a collector electrode and having their emitter electrodes connected together;

a third resistor having one terminal connected to each said emitter electrode;

separate collector resistors each having one end connected to the collector electrode of a different one of said third and fourth transistors;

means for applying operating potential between the other end of the third resistor and the other end of each of the collector resistors; and means coupling the output end of each of the two wires in the transmission line to the base electrode of a different one of the third and fourth transistors.

7. The combination comprising:

a driver circuit including at least first and second transistors of one conductivity type each having a base, an emitter and a collector; a resistor connected in common between each said emitter electrode and a point of reference potential; separate collector resistors connected between each different collector electrode and said point of reference potential; third and fourth transistors of said one conductivity type each having a base electrode connected to a different collector electrode of the first and second transistors, a collector electrode connected to said point of reference potential and an emitter electrode; separate resistors connected between said point of reference potential and the emitter electrodes of the third and fourth transistors;

a driven circuit having the same configuration as the driver circuit described above;

means applying a fixed bias to the first transistor in the driver circuit;

input signal means coupled to the base of the second transistor in said driver circuit;

first and second conductors defining a transmission line having an input end and an output end;

means coupling the input ends of the first and second conductors to the emitters of different ones of the third and fourth transistors in the driver circuit; and means connecting the output ends of the first and second conductors to the base electrodes of different ones of the first and second transistors in the driven circuit.

8. The combination comprising:

a driver circuit including at least first and second transistors of one conductivity type each having a base, an emitter and a collector; a resistor connected in common between each said emitter electrode and a point of reference potential; separate collector resistors connected between each different collector electrode and said point of refernce potential; third and fourth transistors of said one conductivity type each having a base electrode connected to a different collector electrode of the first and second transistors, a collector electrode connected to said point of reference potential and an emitter electrode; separate resistors connected between said point of reference potential and the emitter electrodes of the third and fourth transistors;

a driven circuit having the same configuration as the driver circuit described above;

means for applying a fixed bias to the first transistor in the driver circuit;

input signal means coupled to the base of the second transistor in said driver circuit;

first and second conductors defining a transmission line having an input end and an output end;

a first resistor connected between the input end of the first conductor and the emitter of the third transistor in the driver circuit;

a second resistor connected between the input end of the second conductor and the emitter of the fourth transistor in said driver circuit, said first and second transistors having values, which, together with the output impedances of the emitter followers in said driver circuit, terminate the input end of said transmission line in its characteristic impedance; and means connecting the output ends of the first and second conductors to the base electrodes of different ones of the first and second transistors in the driven circuit.

References Cited

UNITED STATES PATENTS

| | | | |
|---|---|---|---|
| 2,957,944 | 10/1960 | De Monte | 333—32 X |
| 3,140,405 | 7/1964 | Kolling | 307—88.5 |
| 3,197,719 | 7/1965 | Wells | 307—88.5 |
| 3,259,761 | 7/1966 | Narud et al. | 307—88.5 |

ARTHUR GAUSS, *Primary Examiner.*

D. D. FORRER, *Assistant Examiner.*

UNITED STATES PATENT OFFICE

CERTIFICATE OF CORRECTION

Patent No. 3,329,835 July 4, 1967

Michael V. D'Agostino

It is hereby certified that error appears in the above numbered patent requiring correction and that the said Letters Patent should read as corrected below.

Column 2, line 18, for "collector" read -- collectors --; column 3, line 28, after "value" insert -- plus the value --; column 4, line 40, for "volts", second occurrence, read -- volt --; line 66, for "equipped" read -- equal --; column 5, line 11, for "indues" read -- induces --; line 52, for "based" read -- biased --; line 53, for "manis" read -- mains --.

Signed and sealed this 22nd day of October 1968.

(SEAL)

Attest:

Edward M. Fletcher, Jr.

Attesting Officer

EDWARD J. BRENNER

Commissioner of Patents